Patented Sept. 29, 1936

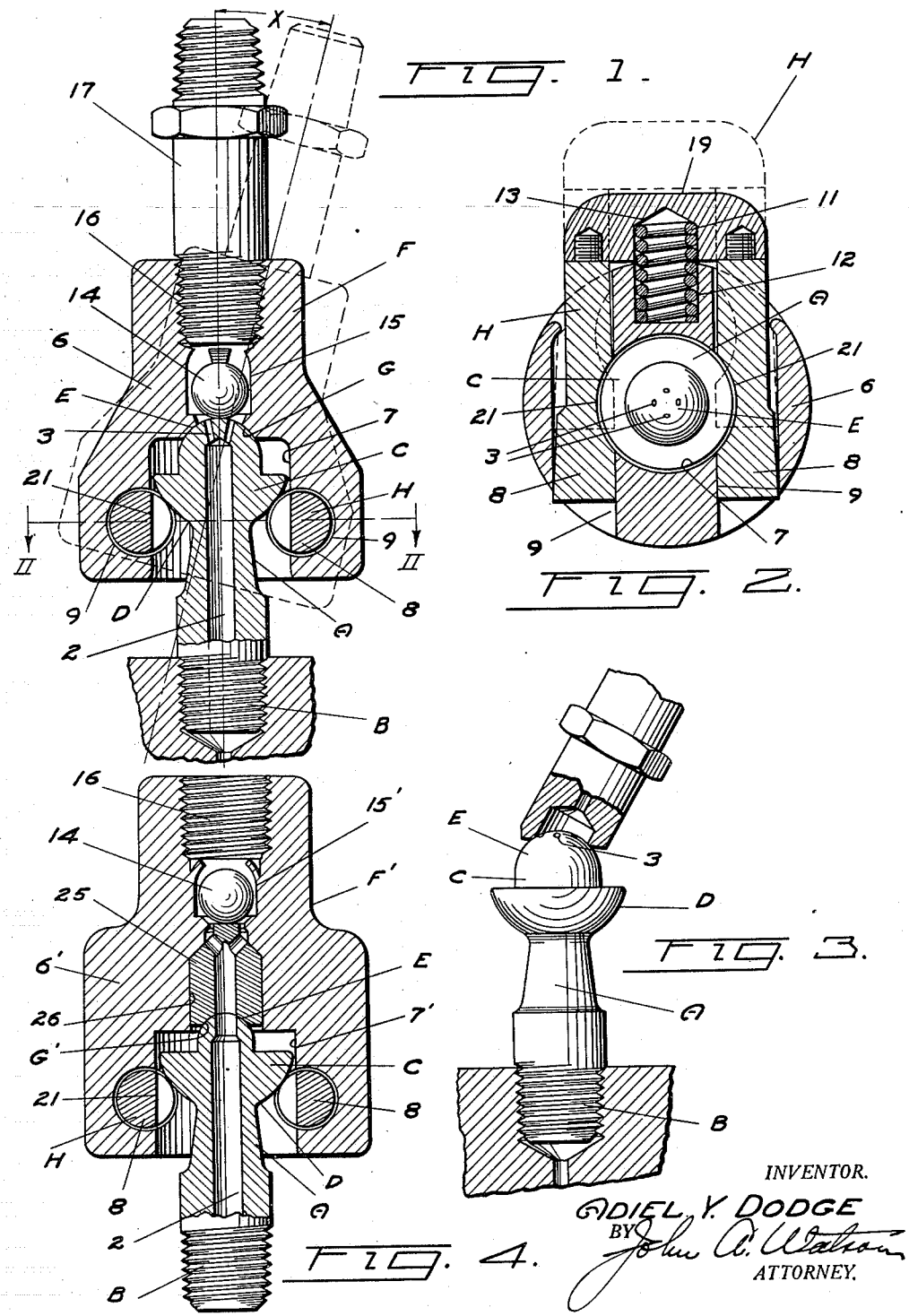

2,055,603

UNITED STATES PATENT OFFICE 2,055,603

LUBRICATION DEVICE

Adiel Y. Dodge, South Bend, Ind., assignor to The Lubrication Corporation, South Bend, Ind., a corporation of Delaware Application February 20, 1933, Serial No. 657,576

3 Claims. (Cl. 285—91)

This invention relates to improvements in lubricating devices and more particularly to lubricant receiving fittings and to lubricant couplers or discharge nozzles therefor.

Heretofore many types of lubricant receiving fittings of the kind commonly used on the bearings and other moving parts of automobile chassis and machinery have been provided wherein universal sealing engagement between a lubricant discharge nozzle, of the contact type, and the fitting may be established and maintained during the servicing operation. The advantage attributed to this type of apparatus is that a relatively wide angle of approach of the nozzle relative to the fitting is attained, which is of particular importance in such cases as when the fitting is located in an otherwise inaccessible position on the chassis or machine. This general type of fittings with the exception of one species in which the head of the fitting is spherical may not be employed with nozzles or couplers intended for clamping engagement with the fitting during the servicing operation.

An object of this invention is to provide a lubricant receiving fitting having a spherical surface, for clamping engagement by the jaws of a nozzle clamping instrumentality, the area of which is relatively large as compared to that portion of the fitting with which sealing engagement with the nozzle is effected.

Another object is to provide a lubricant receiving fitting which may be serviced, at will, by either a contact or a clamp type lubricant discharge nozzle.

A further object is to provide a clamp type nozzle, or coupler, for a fitting as described incorporating manually operable clamping instrumentality for effecting positive non-yielding clamping engagement between the nozzle and fitting.

Other objects, the advantages and uses of the invention will be, or should become, apparent after reading the following description and claims and after consideration of the accompanying drawing forming a part of this specification in which:

Fig. 1 is a vertical sectional view of a lubricant receiving fitting and lubricant discharge nozzle embodying features of the invention;

Fig. 2 is a sectional view along the lines II—II of Fig. 1;

Fig. 3 is a side elevation of the fitting illustrated in Fig. 1 with a discharge nozzle of the contact type applied thereto; and Fig. 4 is a view similar to Fig. 1 illustrating another form of the discharge nozzle.

In general the apparatus selected for illustration herein comprises a lubricant receiving fitting A, having an externally threaded shank B at its lower end and an enlarged head portion C at its outer end presenting a substantially hemispherical clamp engaging surface D and a hemispherical nozzle engaging contact surface E, a lubricant discharge nozzle F having a discharge orifice G, the walls of which conform in curvature to the surface E, and a manually operable clamping member H engageable with the surface D of the fitting head to maintain sealing contact between the nozzle and fitting surfaces E and G, respectively.

Referring particularly to Figures 1 and 2, the fitting A is formed with a lubricant conducting bore 2 extending longitudinally therethrough terminating at its upper end in a plurality of lubricant passageways 3 communicating, in geometric formation, with the surface E of the fitting head, as shown in Fig. 2. In order that true universal movement of the nozzle F over the fitting head be attained without altering relative thrust between the surfaces E and G, the nozzle and fitting surfaces D and E are preferably generated about a common center, although, as will be hereinafter explained, the surfaces may be generated about centers which are spaced apart along the axis of the fitting without departing from the spirit and scope of the invention.

The discharge nozzle or coupler F comprises a body 6 having a cylindrical walled recess 7 forwardingly of the contact surface G of a diameter sufficient to admit the head C of the fitting therein so that annular sealing engagement may be had between the fitting and the contact surface as shown. The clamping member H may be U shaped as shown in Fig. 2 and formed with its parallel portions or arms 8 substantially cylindrical in contour for sliding engagement and support within parallel bores 9 through the body 6 of the nozzle, located in a plane perpendicular to the longitudinal axis, thereof. A compression spring 11 may be interposed between the body 6 of the nozzle and the adjacent inner side wall of the clamp member H for normally maintaining the clamp member in the position represented by dotted lines in Fig. 2, i. e. in that position for clamping the nozzle upon the fitting head. Recesses 12 and 13 formed in the body 6 and the clamp member H may be provided to preclude the displacement of the spring and to give adequate space for a spring of sufficient length to properly actuate the clamp member.

A check valve 14, of the steel ball type, may be employed in the lubricant conducting passageway 15 of the nozzle, rearwardly of the sealing contact surface G, for normally closing the discharge port of the nozzle defined by the surface G, through the medium of lubricant pressure, from the source of lubricant supply, acting upon the valve. The valve ball is so arranged, however, that with the parts assembled as shown in Fig. 1, as during the servicing operation, the spherical surface E of the fitting will engage with the ball 14 to urge it away from its seat and thus establish lubricant flow through the passageway 15 into the fitting. The rearward end of the passageway 15 may be internally threaded as shown at 16 for connection with a nipple 17, which may be coupled either directly to a lubricant gun of the hand type, or to a flexible hose forming a part of a source of lubricant supply.

In servicing the fitting A as with the nozzle F the operator, while holding the nozzle in his hand, may press inwardly upon the outer end 19 of the clamping member H against the force of the compression spring 11, to cause the clamping member to assume the position shown in full lines in Fig. 2. It will be noted that the inner and adjacent walls of the parallel portions of the clamping member H, are recessed as indicated at 21 to coincide with the curvature of the cylindrical walled recess 7 so that with the clamping member in the position shown in full lines the fitting head may be admitted to the nozzle recess and contact between the surfaces G and E established upon locating the nozzle over the head.

The operator may next relieve manual pressure upon the clamping member H, thereby permitting the spring 11 to urge the clamping member to its normal clamped position indicated in dotted lines in Fig. 2, to cause the adjacent cylindrical walls of the clamping member to ride upon the hemispherical surface D of the fitting and to establish relative thrust between the contacting and sealing surfaces G and E of the nozzle and fitting, respectively. During the engagement of the nozzle with the fitting, as described, the valve ball will assume the position shown in Fig. 1 and lubricant admitted to the nozzle under pressure may pass through the nozzle passageway and into the lubricant conducting bore 2 of the fitting. During the servicing operation, as will be apparent, the nozzle F may be moved throughout an angular range relative to the axis of the fitting, represented by twice the angle X. If the fitting is located in a position which is not ordinarily accessible to a nozzle of the type wherein sealing engagement may be established with the fitting, only along an axis coinciding with that of the fitting head no difficulty is presented in applying the nozzle F to the fitting since initial engagement of the nozzle and fitting may be carried out through the approach of the nozzle along any axis within the angle defined by twice the angle X, as indicated in Fig. 1.

In the fitting and nozzle set forth herein certain definite advantages are provided, not to be attributed to nozzles of the type heretofore in use, the most important of which is the provision of relatively large areas with which the clamping jaw, or member H of the nozzle may engage during the application of clamping thrust between the nozzle and fitting, thus to discourage mutilation of the fitting head through excessive clamping pressures and continued use of the apparatus over a long period of time. Another advantage flowing from the structural characteristics of the fitting is that the surface E, through which lubricant tight sealing engagement with the nozzle is effected, is virtually protected by the enlarged lower half of the fitting head circumscribing the base of the surface E. Further, the spherical surface E of the fitting head because of its relatively small radius may lie well within the walls of the discharge orifice of the nozzle, thus facilitating the cooperative registration of the nozzle and fitting surfaces G and E, respectively, and providing a relatively small fitting area subjected to lubricant pressure without defeating the advantageous characteristics of broad clamp engaging surface.

In Fig. 4 a modified form of the nozzle is illustrated at F' wherein the clamping instrumentality H may be identical to that of the nozzle of Figures 1 and 2, but differing from the nozzle F in that the valve ball 14 is urged to its open position by thrust transmitted, by relative longitudinal movement between the nozzle and fitting, through a plunger 25 having, in its outermost end, a fitting engaging sealing contact surface G'. The plunger is slidably mounted within an enlarged portion 26 of the nozzle bore 15'. With this type of nozzle clamping thrust between the fitting surface E and the nozzle orifice wall G' is obtained through the application of lubricant pressure acting upon the plunger 25 and tending to urge the plunger outwardly of bore 26. With a nozzle, such as shown in Fig. 4, it is not essential that the surfaces E and D of the fitting be generated about a common center. This departure from the form of the fitting shown is made possible by the mobility of the plunger 25 including the sealing contact surface G. It is contemplated, therefore, that the fitting may be constructed either with the surfaces D and E about a common center or about separate and independent centers.

It is to be understood that the embodiments of the invention herein set forth are presented for the purpose of illustration only, and various changes may be made without departing from the spirit of the invention and the scope of the appended claims.

I claim:
1. In combination, a lubricant receiving fitting having a portion thereof formed with a spherical exterior surface and another portion thereof formed to provide a nozzle contacting surface, a lubricant discharge nozzle having a discharge orifice provided with a concave spherical wall portion for contacting said contact surface of said fitting, the radius of curvature of said discharge orifice wall being less than the radius of curvature of said spherical fitting surface, and a clamping jaw carried by the nozzle adapted to be moved into engagement with said spherical exterior surface of the fitting.

2. In combination, a lubricant receiving fitting having an enlarged head separated from the body of the fitting by a neck of reduced diameter, said head having two spherical surfaces generated upon radii of different lengths, the surface having the lesser radius of curvature being on the upper portion of said head, a lubricant discharge nozzle having a discharge orifice the wall of which is adapted for sealing engagement with said upper spherical surface of said fitting head, and a clamp member mounted for movement on said nozzle in a plane transverse to the axis of said discharge orifice, said clamp member having a pair of spaced apart portions presenting convexly curved surfaces for movement into and out of contact with opposed sides respectively of said spherical fitting surface of longer radius when said clamp member is moved relative to said nozzle.

3. A lubricant discharge nozzle for a lubricant receiving fitting characterized by a spherical nozzle engaging surface of relatively short radius, and a spherical clamp engaging surface of relatively large radius comprising, a lubricant conducting body formed with an annular spherical walled fitting contact surface surrounding the mouth of the bore thereof, and a clamp member mounted for sliding movement in a plane perpendicular to the axis of said annular contact surface, said clamp member having a pair of spaced apart convexly cylindrical walled portions adapted to be moved into engagement at will with said fitting surface of relatively long radius.

ADIEL Y. DODGE.